US012676101B2

(12) United States Patent
Wu et al.

(10) Patent No.: US 12,676,101 B2
(45) Date of Patent: Jul. 7, 2026

(54) METHOD FOR ADJUSTING BRIGHTNESS OF AN ELECTRONIC VISUAL DISPLAY

(71) Applicant: Resideo USA LLC, Golden Valley, MN (US)

(72) Inventors: Xuemei Wu, Golden Valley, MN (US); Silver Yang, Golden Valley, MN (US); Yanli Wang, Golden Valley, MN (US)

(73) Assignee: Resideo USA LLC, Golden Valley, MN (US)

( * ) Notice: Subject to any disclaimer, the term of this patent is extended or adjusted under 35 U.S.C. 154(b) by 0 days.

(21) Appl. No.: 18/716,735

(22) PCT Filed: Dec. 22, 2021

(86) PCT No.: PCT/US2021/073081

§ 371 (c)(1),
(2) Date: Jun. 5, 2024

(87) PCT Pub. No.: WO2023/121687

PCT Pub. Date: Jun. 29, 2023

(65) Prior Publication Data

US 2025/0046230 A1 Feb. 6, 2025

(51) Int. Cl.
*G09G 3/20* (2006.01)

(52) U.S. Cl.
CPC ... *G09G 3/2096* (2013.01); *G09G 2320/0626* (2013.01)

(58) Field of Classification Search
CPC ...... H04N 23/745; H04N 23/70; H04N 23/73; H04N 23/71; H04N 19/105; H04N 19/109;

(Continued)

(56) References Cited

U.S. PATENT DOCUMENTS

2003/0122810 A1* 7/2003 Tsirkel .................... G09G 3/20
345/207
2010/0039414 A1 2/2010 Bell
(Continued)

FOREIGN PATENT DOCUMENTS

EP 1505567 A1 2/2005

OTHER PUBLICATIONS

International Search Report and Written Opinion in PCT International Application No. PCT/US2021/073081 mailed Apr. 4, 2022.

*Primary Examiner* — Sujit Shah
(74) *Attorney, Agent, or Firm* — Greenberg Traurig LLP; Nicholas Martin; David J. Dykeman

(57) ABSTRACT

A method for adjusting brightness of an electronic visual display of an electronic device, comprising: identifying a luminance-indicating area in a field of view of an image sensor of the electronic device; capturing at least one first image of the field of view by the image sensor; determining an ambient luminance value for the electronic visual display using the luminance-indicating area of the at least one first image; and adjusting the brightness of the electronic visual display according to the determined ambient luminance value. The method can further involve capturing a plurality of second images of the field of view by the image sensor, each second image being taken at a different time of a day, and analyzing the plurality of second images so as to identify an area of the field of view of the image sensor which has the most stable average luminance level.

17 Claims, 3 Drawing Sheets

(58) Field of Classification Search
CPC ................ H04N 19/136; H04N 19/142; G06T 2207/10016; G06T 5/92; G06T 7/254; G06T 5/40; G06T 5/50; G06T 5/70; G06T 2207/10004; G09G 2320/0626; G09G 2360/144
See application file for complete search history.

(56) References Cited

U.S. PATENT DOCUMENTS

| | | | | |
|---|---|---|---|---|
| 2014/0225980 | A1* | 8/2014 | Patel ...................... | H04N 7/141 348/370 |
| 2015/0187286 | A1* | 7/2015 | Lee ....................... | G06F 3/1423 345/82 |
| 2016/0322006 | A1* | 11/2016 | Chen .................... | G09G 3/3426 |
| 2017/0352142 | A1* | 12/2017 | Tsuchiya .............. | G06V 10/751 |
| 2020/0143519 | A1* | 5/2020 | Gordon ................. | G06T 3/4046 |
| 2020/0195818 | A1* | 6/2020 | Li .......................... | H04N 23/71 |

* cited by examiner

METHOD FOR ADJUSTING BRIGHTNESS OF AN ELECTRONIC VISUAL DISPLAY

CROSS-REFERENCE TO RELATED APPLICATIONS

This application is a U.S. National Phase patent application under 35 U.S.C. 371 of International Application No. PCT/US2021/073081, filed Dec. 22, 2021, the entire contents of which is incorporated herein by reference in its entirety.

FIELD OF THE INVENTION

The present invention generally relates to a method for adjusting brightness of an electronic visual display, and in particular to brightness control of an electronic visual display used in a security system.

BACKGROUND TO THE INVENTION

An electronic visual display is a display apparatus for presentation of any visual content e.g., texts, images or videos, which is transmitted electronically. Among various different electronic visual displays, light-emitting diode (LED) displays and liquid-crystal displays (LCDs) are the two most widely used types of displays. Electronic visual displays have become ubiquitous in people's daily lives. This is evidenced by the fact that electronic visual displays are present in almost all household electrical appliances (e.g., air conditioners, microwave ovens, home security systems) and consumer electronics (e.g., laptops, television sets, mobile computing devices). At present, many electronic visual displays, in particular LED displays and LCDs, have incorporated technologies that allow their brightness to be dynamically adjusted in response to a change in brightness of their ambient light, e.g., the brightness of a display is increased when the ambient environment gets brighter, or decreased when the ambient environment gets darker.

In an existing home or business security system, a control panel is used to communicate with a number of sensors via a wired or wireless path and to provide a user interface between the human user and the security system so as to allow the user to arm and disarm the system. The control panel often comprises an electronic visual display (e.g., a LED display and/or a LCD) for displaying present status of the security system and a keypad for allowing the user to enter or change settings of the system. The brightness of the control panel display may be automatically adjusted (e.g., dimed) when the control panel detects a change (e.g., darkening) in the surrounding light level.

Such an automatic brightness control typically relies on use of one or more ambient light sensors dedicated to monitor the ambient light level, which adds complexity and costs to the security system. In some existing implementations, the ambient light sensors constantly monitor a given space (e.g., a room) in which the control panel is installed (e.g., on a wall of the room) and output a luminance value which corresponds to either a total/accumulated light level or an average light level of the monitored space. Subsequently, the control panel adjusts the brightness of the display according to the total/average luminance value.

The aforementioned brightness control method may be capable of accurately determining a desired display brightness where the light is homogeneously distributed across the monitored space. However, in cases where the light is in-homogeneously distributed across the monitored space (e.g., when localized artificial light is present), the accuracy of the brightness control will be negatively impacted. By way of an example, where localized artificial light is present in the monitored space, it can result in a significantly increased total/average luminance value of the monitored space whereas in the meantime the ambient light level of the area (e.g., a corner of a room) that is immediately adjacent to the control panel stays substantially unchanged. In such a situation, the brightness of the control panel display will be undesirably increased in response to an increased total/average luminance value as a result of the presence of the artificial light. Inaccurate brightness control of a control panel display can not only give a bad user experience but also cause issues when the user finds the information on the display unreadable.

Objects and aspects of the present claimed invention seek to alleviate at least these problems with the prior art.

SUMMARY OF THE INVENTION

According to a first aspect of the present invention, there is provided a method for adjusting brightness of an electronic visual display of an electronic device, comprising: identifying a luminance-indicating area in a field of view of an image sensor of the electronic device; capturing at least one first image of the field of view by the image sensor; determining an ambient luminance value for the electronic visual display using the luminance-indicating area of the at least one first image; and adjusting the brightness of the electronic visual display according to the determined ambient luminance value; wherein the step of identifying the luminance-indicating area in the field of view of the image sensor comprises: capturing a plurality of second images of the field of view of the image sensor, each second image being taken at a different time of a day, and analyzing the plurality of second images so as to identify an area of the field of view of the image sensor which has the most stable average luminance level.

In an embodiment, the plurality of second images of the field of view are each taken at a predetermined time interval. Alternatively or in addition, the plurality of second images of the field of view are taken respectively at a plurality of predetermined times.

In an embodiment, the step of determining the ambient luminance value for the electronic visual display comprises obtaining a luminance value for each pixel of the luminance-indicating area of the at least one first image. In an embodiment, the step of determining the ambient luminance value for the electronic visual display further comprises obtaining the ambient luminance value by taking an average of the luminance values of all pixels of the luminance-indicating area of the at least one first image.

In an embodiment, the step of adjusting the brightness of the electronic visual display comprises comparing the ambient luminance value determined for the electronic visual display with a reference luminance value or a reference luminance table.

In an embodiment, the step of adjusting the brightness of the electronic visual display further comprises decreasing the brightness of the electronic visual display to a level corresponding to the ambient luminance value when the ambient luminance value is lower than the reference luminance value. In an embodiment, the step of adjusting the brightness of the electronic visual display further comprises increasing the brightness of the electronic visual display to a level corresponding to the ambient luminance value when the ambient luminance value is higher than the reference luminance value. In an embodiment, the step of adjusting the brightness of the electronic visual display further comprises maintaining the brightness of the electronic visual display when the ambient luminance value is equal to the reference luminance value. In an embodiment, the reference luminance value is a previous ambient luminance value determined based on one or more previously captured first images.

In an embodiment, the reference luminance table comprises a plurality of reference luminance ranges, each range corresponding to a specific brightness level. In an embodiment, the step of adjusting the brightness of the electronic visual display further comprises determining a target brightness by identifying which reference luminance range the ambient luminance value falls into. In an embodiment, the step of adjusting the brightness of the electronic visual display further comprises adjusting the brightness of the display to the target brightness.

In an embodiment, the electronic device is a security control panel of a security system. In an embodiment, the method further comprises turning off the electronic visual display when the security system is in an armed state. In an embodiment, the step of capturing the at least one first image of the field of view by the image sensor is performed at a predetermined time interval when the security system is in a disarmed state.

In an embodiment, the electronic visual display comprise one or both of: a liquid crystal display; a light-emitting diode display.

According to a second aspect of the present invention, there is provided a computer program comprising program instructions operable to perform the method of the first aspect, when run on a suitable apparatus.

According to a third aspect of the present invention, there is provided a non-transient computer program carrier comprising the computer program of the second aspect.

According to a fourth aspect of the present invention, there is provided an electronic device, comprising: an image sensor having a field of view and configured to take images; an electronic visual display; a memory unit storing a computer program comprising program instructions for adjusting brightness of the electronic visual display; and a processing unit; wherein upon executing the computer program, the processing unit is to: identify a luminance-indicating area in the field of view of the image sensor; command the image sensor to capture at least one first image of the field of view; determine an ambient luminance value for the electronic visual display using the luminance-indicating area of the at least a first image; and adjust the brightness of the electronic visual display according to the determined ambient luminance value; wherein at the step of identifying the luminance-indicating area in the field of view of the image sensor, the processing unit is further to: command the image sensor to capture a plurality of second images of the field of view of the image sensor, each second image being taken at a different time of a day, and analyze the plurality of second images of the field of view so as to identify an area of the field of view of the image sensor which has the most stable average luminance level.

In an embodiment, the electronic visual display comprises one or both of: a liquid crystal display; a light-emitting diode display.

According to a different aspect of the present invention, there is provided a security system comprising an electronic device of the fourth aspect.

Other aspects of the invention comprise a security system comprising the electronic device of the second aspect.

BRIEF DESCRIPTION OF THE DRAWINGS

Embodiments of the present invention will now be described by way of example only and with reference to the accompanying drawings, in which.

DETAILED DESCRIPTION OF THE EMBODIMENTS

FIGS. 1 to 5C are related to embodiments of a method for adjusting brightness of an electronic visual display of an electronic device. The method may comprise: identifying a luminance-indicating area in a field of view of an image sensor of the electronic device; capturing at least one first image of the field of view by the image sensor; determining an ambient luminance value for the electronic visual display using the luminance-indicating area of the at least one first image; and adjusting the brightness of the electronic visual display according to the determined ambient luminance value. The step of identifying the luminance-indicating area in the field of view of the image sensor may comprise: capturing a plurality of second images of the field of view by the image sensor, each second image being taken at a different time of a day, and analyzing the plurality of second images so as to identify an area of the field of view of the image sensor which has the most stable average luminance level.

Figure 1:
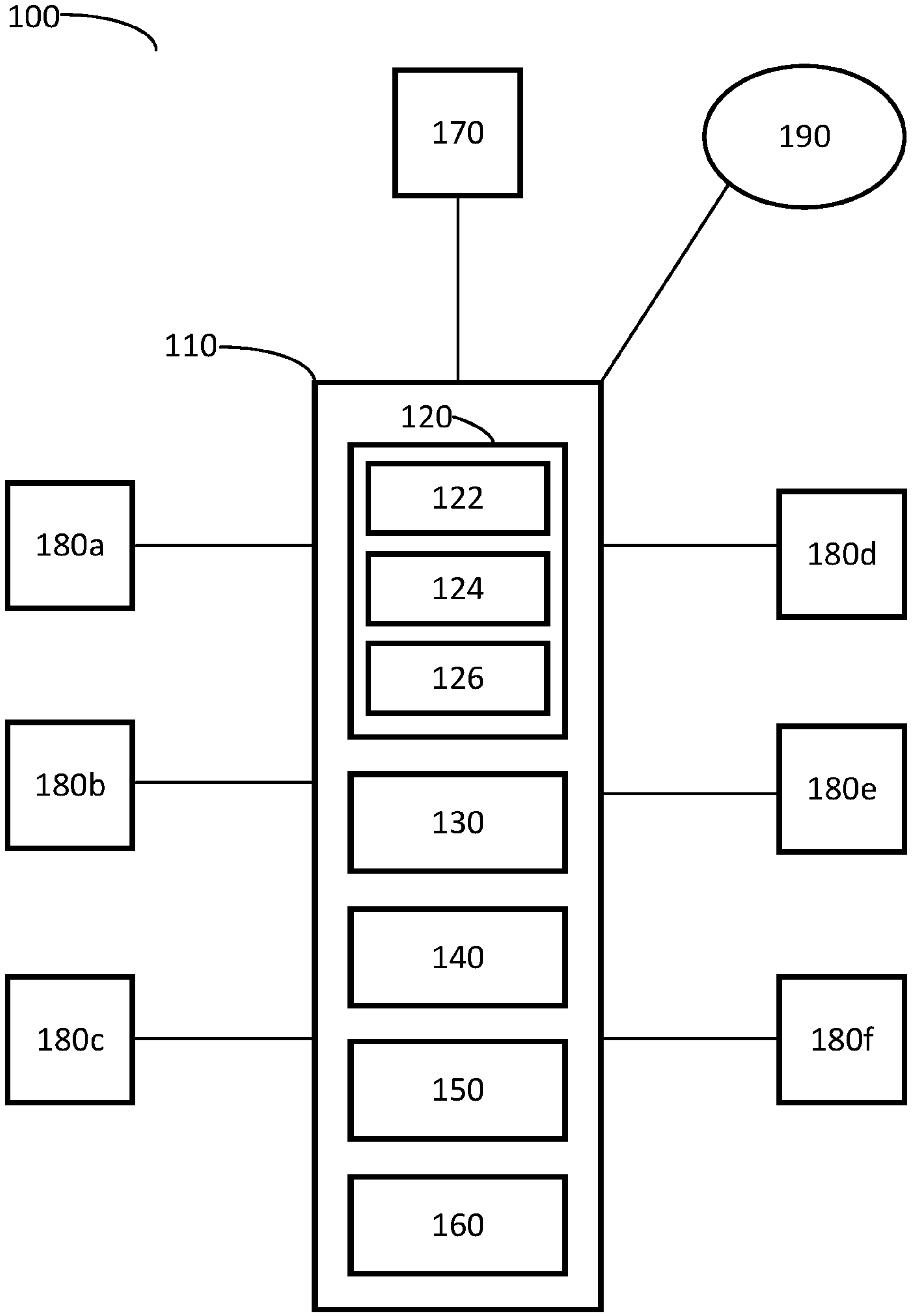
FIG. 1 depicts schematically a functional block diagram of a security system in accordance with an embodiment.

With reference to FIG. 1, the security system 100 comprises a control panel 110, a plurality of sensors 180*a*-180*f* and a siren 170. The control panel 110 may be communicatively coupled to the components (e.g., the sensors 180*a*-180*f* and siren 170) of the security system 100 via a wired or wireless path. In an embodiment, the control panel may be communicatively coupled to a central control center or a remote server 190 via a data network (e.g., the internet). The central control center or remote server 190 may act to monitor and control a plurality of security systems 100 in a certain area.

The sensors 180*a*-180*f* may be of any type of sensors commonly used in a home or business security system, which may include for example, one or more motion sensors 180*a* for detecting when a person enters a room, one or more fire sensors 180*b* for indicating that a fire has been detected, one or more window 180*c* and door sensors 180*d* for indicating that a window or door has been opened, and/or one or more shock sensors 180*e* for detecting a shock that occurs when a burglar strikes the door or window with a hard object. Different and/or additional sensors 180*f* may be provided.

The control panel 110 may be configured to receive, process and transmit signals. To provide such functionalities, the control panel 110 may comprise a processing unit 130 (e.g., a microprocessor) for processing information (e.g., signals received from the components of the security system 100 and the remote server 190 where available), a memory unit 140 (e.g., non-transient memory) for storing data (e.g., system information and control programs), a power unit 150 for powering the components of the control panel 110, and a communication unit 160 (e.g., a transceiver) for receiving signals from and transmitting signals to the components of the security system 100 and the remote server where available.

The control panel 110 may further be configured to provide a user interface between the human user and the security system 100. As can be seen in FIG. 1, the user interfacing functionalities may be provided by an integrated user interface unit 120 comprised in the control panel 110. In an embodiment, the user interface unit 120 may comprise an image sensor 122 (e.g., a digital camera), an electronic visual display 124 (e.g., a LCD backlit by LEDs) and a key pad 126. The user interface unit 120 may be used to arm and disarm the security system 100. The image sensor 122 may be used to capture images of the user whenever the user tries to change a setting of the control panel 110, e.g., to arm and disarm the security system 100. Each image may be formed by a plurality of image pixels and may be used for example to verify whether the user is authorized to make such a change. In addition, the image sensor 122 may be configured to monitor an ambient environment (e.g., ambient light level) of the control panel 110. The monitoring of the ambient environment may be achieved by periodically or intermittently taking an image of the ambient environment. The key pad 126 may be used to allow the user to input information so as to alter the setting of the control panel 110.

In an embodiment, the user interface unit 120 may be comprised in a separate user interface device that is located differently to the control panel 110 and is communicatively coupled to the control panel 110 via a wired or wireless path. The separate user interface device may comprise same or similar components as the control panel 110, e.g., a processing unit, a memory, a power unit and a communication unit. In an embodiment, the key pad 126 may be provided by a touch screen which is an integral part of the display 122.

Figure 2:
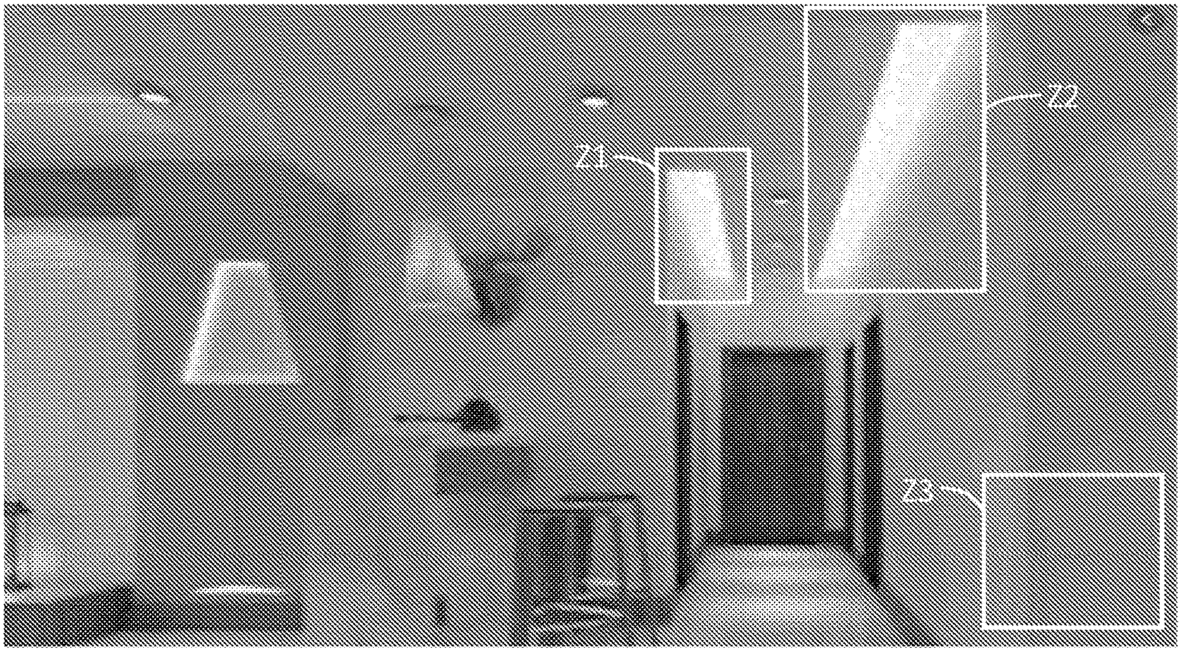
FIG. 2 shows an example image of a field of view of a camera in a control panel of the security system (e.g., as shown in FIG. 1)

With reference to FIG. 2, the control panel 110 may be affixed on a wall facing a corridor of an apartment and the image sensor 122 may have a field of view covering various furniture items, interior lightings and other decorations. As indicated by zone Z1 and zone Z2 in FIG. 2, the interior lightings, once switched on, emit strong artificial light that significantly increases the luminance level in both zones Z1, Z2. By comparison, the luminance level of zone Z3 which is in close proximity to the control panel 110 is less affected by the artificial light emitted from the interior lightings. If the aforementioned prior art method were used to control the brightness of the display 124, the brightness of the display 124 would have been increased in response to an increased total or average luminance level of the entire image. However, the luminance level of the area (e.g., zone Z3) which is immediately adjacent to the control panel 110 is less affected after the interior lightings were switched on. In other words, the luminance level of the area (e.g., zone Z3) does not change drastically due to the operation of the interior lightings and thus provides a more stable indication of the luminance level of the ambient environment. Therefore, a more accurate brightness level of the display 124 can be determined if such determination is made based on a luminance level of a certain area in the field of view which has the most stable average luminance level (e.g., least affected by the artificial light).

Figure 3:
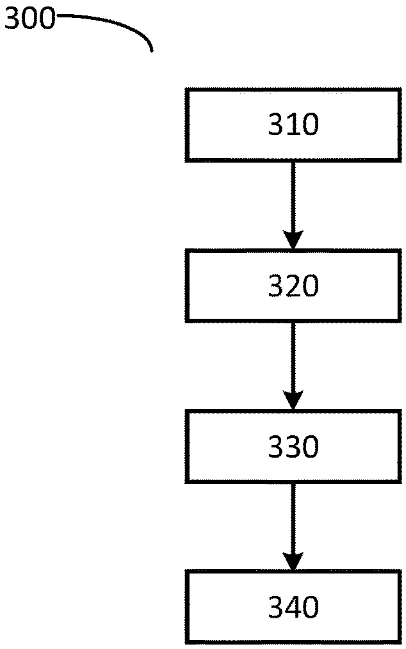
FIG. 3 shows a flow diagram of the method for adjusting brightness of an electronic visual display comprised in the security system (e.g., as shown in FIG. 1) in accordance with an embodiment.

With reference to FIG. 3, in an embodiment, the accurate and automatic brightness control may be implemented by means of a brightness control program 300 comprising control instructions for the processing unit 130. The brightness control program 300 may be stored in the memory unit 140 and may be executable by the processing unit 130 of the control panel 110. The brightness control program 300, when executed, may cause the processing unit 130 to perform the following steps.

In step 310, the processing unit 130 may identify a luminance-indicating area (e.g., zone Z3) in the field of view (e.g., as shown in FIG. 2) of the image sensor 122 of the electronic visual display 124. The luminance-indicating area (e.g., zone Z3) may be used for accurate indication of the level of the ambient light that is subsequently used to determine the brightness level of the display 124 (as described in the following steps). The luminance-indicating area may comprise a subset of the plurality of pixels of an image captured by the image sensor 122. Once captured, the digital image may be stored in the memory unit 140 of the control panel 110. Information of each pixel, such as color and luminance (e.g., represented in YCbCr color space) may be obtainable by the processing unit 130. The identification of a luminance-indicating area may be performed after the control panel 110 was first installed, e.g., shortly after the installation. Further details of the step 310 will be described below in relation to FIG. 4. Once the luminance-indicating area is identified, the process may progress to step 320.

Note that in contrast to existing technologies (e.g., as described above) where one or more dedicated image sensors are required for monitoring the ambient light level, the brightness control program 300 can be implemented with an existing built-in image sensor that is already present in the control panel 110 and originally configured to carry out tasks other than monitoring of the ambient light level. Such tasks may include for example capturing pictures of a user when the user intends to operate the control panel 110 (e.g., to arm or disarm the security system 100) so as to verify authorization for the intended operation and/or keep the pictures of the (unauthorized) user as evidence for later use; and recording videos when the control panel 110 receives an alarm signal generated by any of the sensors **180*a*-180*f***.

In step 320, the processing unit 130 may command the image sensor 122 to capture at least one image of the field of view. In an embodiment, images may be captured in a periodical manner, i.e. at a predetermined time interval. For example, the image sensor 122 may capture at least one image per every one hour, at least one image per every two hours, or at least one image per every three hours. Once an image or images is/are captured, the processing unit 130 may continue to progress to step 330.

In step 330, the processing unit 130 may determine an ambient luminance value for the display 124 based on the luminance-indicating area of the image or images captured in step 320. Where two or more images are captured consecutively (e.g., within the predetermined time interval), each image may be used to determine an ambient luminance value and all the determined ambient luminance values may be averaged to determine a final ambient luminance value. The ambient luminance value is able to indicate the ambient light level around the control panel 110 in a more accurate manner and thus allows for a more accurate and reliable brightness control. In an embodiment, the processing unit 130 may first obtain a luminance value for each pixel of the luminance-indicating area of the image and then determine the ambient luminance value by taking an average of the luminance values of all pixels of the luminance-indicating area of the image. Note that the ambient luminance value may be determined in many different ways. For example, in an embodiment, the ambient luminance value may be determined by calculating a weighted arithmetic mean of the luminance values of all pixels of the luminance-indicating area of the image. In an embodiment, the ambient luminance value may be determined by analyzing the luminance histogram of the luminance-indicating area of the image.

In step 340, the processing unit 130 may adjust a brightness level of the display 124 according to the ambient luminance value determined in step 330. In an embodiment, the processing unit 130 may compare the ambient luminance value determined in step 330 with a reference luminance value. In an embodiment, the reference luminance value may be a previously determined ambient luminance value based on a previously captured image. In an embodiment, when the ambient luminance value determined in step 330 is less than the reference luminance value, the processing unit 130 may decrease the brightness level of the display 124 to a level corresponding to the ambient luminance value determined in step 330. In an embodiment, when the ambient luminance value determined in step 330 is more than the reference luminance value, the processing unit 130 may increase the brightness level of the display 124 to a level corresponding to the ambient luminance value determined in step 330. In an embodiment, the processing unit 130 may maintain the brightness level of the display 124 when the ambient luminance value determined in step 330 is equal to the reference luminance value.

In different embodiments, the memory unit 140 may store a look up table (or reference luminance table) which may comprise a plurality of reference luminance ranges, each of which may comprise a starting reference luminance value and an ending reference luminance value and each of which may correspond to a specific brightness level of the display 124. In operation, the processing unit 130 may first compare the ambient luminance value determined in step 330 against each range of the reference luminance table. The processing unit 130 may then determine a target brightness for the display 124 after identifying which reference luminance range the ambient luminance value falls into. The processing unit 130 may adjust the brightness of the display 124 to the target brightness.

In cases where the electronic visual display 124 comprises a LCD, the brightness of the display 124 may be adjusted through adjustment of the backlight (e.g., LED backlight) intensity. In cases where the electronic visual display 124 comprises a LED display, the brightness of the display 124 may be adjusted through direct adjustment of the LED intensity.

Optionally or in addition, the brightness control program 300, when executed, may cause the processing unit 130 to perform further steps. For example, the processing unit 130 may turn off the display 124 when the security system 100 is in an armed state. The processing unit 130 may command the image sensor 122 to capture an image at a predetermined time interval when the security system 100 is in a disarmed state. When the user sets the security system 100 to the disarmed state, the processing unit 130 may command the image sensor 122 to capture an image of the user, as described above.

Figure 4:
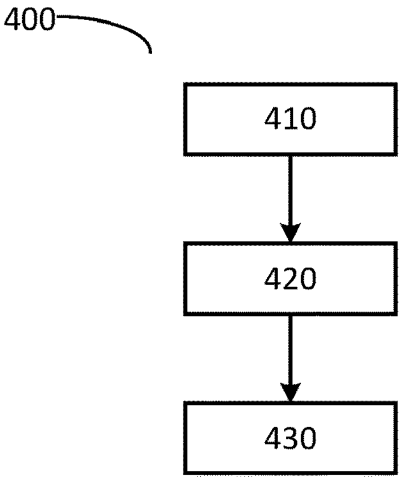
FIG. 4 shows another flow diagram of the method for identifying an area in the field of view of the camera (e.g., as shown in FIG. 2) which has the most stable average luminance level in accordance with an embodiment.
Figure 5A:
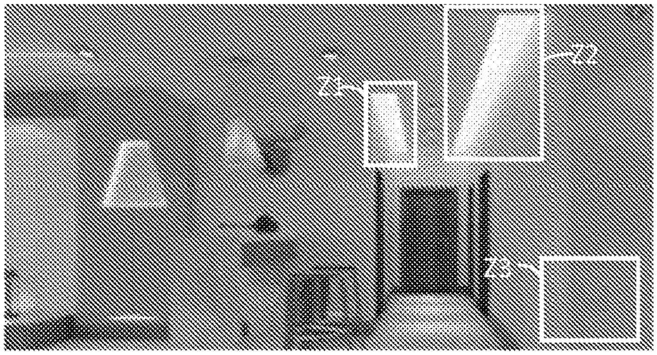
FIGS. 5A-5C show three images captured respectively at three example points of time by the camera in the control panel of the security system (e.g., as shown in FIG. 1).
Figure 5B:
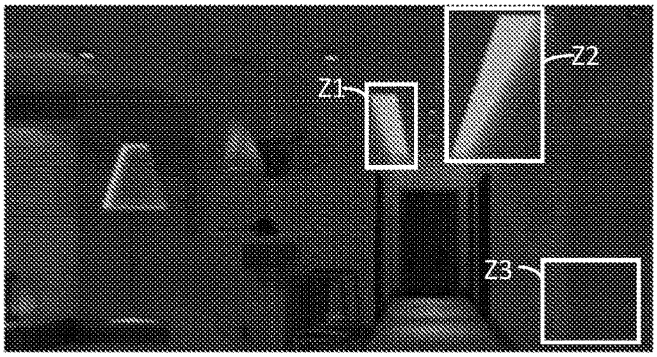
Figure 5C:
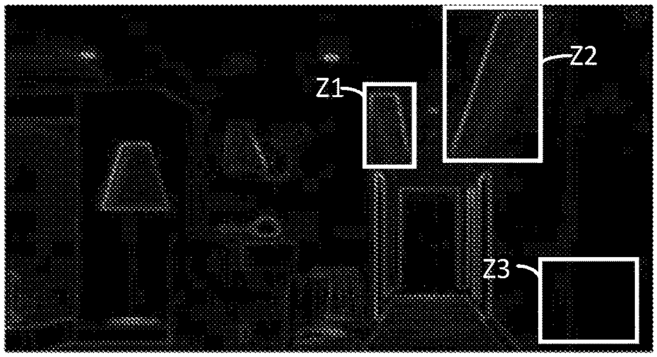

With reference to FIG. 4, in an embodiment, the identification of the luminance-indicating area (e.g., zone Z3) in the field of view of the image sensor 122 may be achieved by means of an area identification program 400 comprising control instructions for the processing unit 130. The area identification program 400 may be stored in the memory unit 140 and may be executable by the processing unit 130 of the control panel 110. The execution of the area identification program 400 may be initiated by a request made to the processing unit 130 by the brightness control program 300. The area identification program 400, when executed, may cause the processing unit 130 to perform the following steps.

In step 410, the processing unit 130 may command the image sensor 122 to take a plurality of images of the field of view of the image sensor. Each image may be taken at a different time of a day. For example, with reference to FIGS. 5A-5C, three images may be taken at 11:00, 20:00 and 24:00, respectively. Such image capturing times may be chosen to facilitate the identification of the artificial light emitted from the interior lightings. The determination of the image capturing times may take account of the natural light level at the time the image was taken. For example, the area identification program may expect that interior lightings are more likely to be switched on in the evening than during the day (e.g., at noon) and therefore may instruct at least one image to be captured in the mid-day and another in the evening. Once images are taken, the processing unit 130 may progress to step 420.

In step 420, the processing unit 130 may analyze the plurality of images of the field of view (e.g., the images shown in FIGS. 5A-5C) so as to identify an area of the field of view which has the most stable average luminance level (e.g., least affected by artificial light). In an embodiment, the analysis may comprise dividing each image into a plurality of areas and comparing the images on an area-by-area basis. The analysis may further comprise calculating a luminance variation for each area between all the images and ranking the plurality of areas according to their respective luminance variations. Based on the ranking of the areas, it is possible to identify both the area (e.g., zone Z1 and zone Z2) in which the average luminance level changes most (e.g., due to presence of interior lights) and the area (e.g., zone Z3) in which the average luminance level changes least.

Note that the images shown in FIGS. 2 and 5A-5C are all based on a specific example setting, different settings may have different arrangements of items, interior lights and decorations, and can thus result in the luminance-indicating area being identified in a location not in the vicinity to the display 124. In cases of the entire field of view of the image sensor being affected by artificial light, the area identification program 400 may identify the area that gives the most stable average luminance level (or the lowest variation in the average luminance level) over a given period of time (e.g., a day or 24 hours). The variation in the average luminance level of the luminance-indicating area (e.g., zone Z3) may be lower than that of the area most affected by artificial light (e.g., zone Z1 or zone Z2) for example, by a factor of 2, by a factor of 5, by a factor of 10, by a factor of 15 or by a factor of 20.

In step 430, storing the positional information of the area identified in step 420 in the memory unit 140. Such positional information may be requested by the brightness control program 300, as described above.

Note that, despite the foregoing embodiments are described in connection with a security system, the method is equally applicable for automatic and accurate brightness control of an electronic visual display comprised in other different electronic devices or systems. Note that, the above description is for illustration only and other embodiments and variations may be envisaged without departing from the scope of the invention.

The invention claimed is:

1. A method comprising:

identifying a luminance-indicating area in a field of view of an image sensor of an electronic device, the electronic device having an associated with electronic visual display;

capturing at least one first image of the field of view by the image sensor;

determining an ambient luminance value for the electronic visual display using the luminance-indicating area of the at least one first image;

adjusting the brightness of the electronic visual display according to the determined ambient luminance value, wherein the step of identifying the luminance-indicating area in the field of view of the image sensor comprises:

capturing a plurality of second images of the field of view by the image sensor, each second image being taken at a different time of a day, the plurality of second images are captured during a calibration period prior to capturing the at least one first image, calculating, for each of a plurality of candidate areas within the field of view, a luminance variation metric based on luminance values measured across the plurality of second images, and analyzing the plurality of second images so as to identify an area of the field of view of the image sensor which has the most stable average luminance level by selecting a candidate area having a minimum luminance variation metric, wherein the step of determining the ambient luminance value for the electronic visual display comprises:

obtaining a luminance value for each pixel of the luminance-indicating area of the at least one first image, and obtaining the ambient luminance value by taking an average of the luminance values of all pixels of the luminance-indicating area of the at least one first image; and storing positional information of the identified luminance-indicating area for subsequent use in determining the ambient luminance value from the at least one first image.

2. The method as claimed in claim 1, wherein the plurality of second images of the field of view are each taken at a predetermined time interval.

3. The method as claimed in claim 2, wherein the plurality of second images of the field of view are taken respectively at a plurality of predetermined times.

4. The method as claimed in claim 1, wherein the plurality of second images of the field of view are taken respectively at a plurality of predetermined times.

5. The method as claimed in claim 1, wherein the step of adjusting the brightness of the electronic visual display comprises comparing the ambient luminance value determined for the electronic visual display with a reference luminance value or a reference luminance table.

6. The method as claimed in claim 5, wherein the step of adjusting the brightness of the electronic visual display further comprises decreasing the brightness of the electronic visual display to a level corresponding to the ambient luminance value when the ambient luminance value is lower than the reference luminance value.

7. The method as claimed in claim 6, wherein the step of adjusting the brightness of the electronic visual display further comprises increasing the brightness of the electronic visual display to a level corresponding to the ambient luminance value when the ambient luminance value is higher than the reference luminance value.

8. The method as claimed in claim 6, wherein the step of adjusting the brightness of the electronic visual display further comprises maintaining the brightness of the electronic visual display when the ambient luminance value is equal to the reference luminance value.

9. The method as claimed in claim 5, wherein the step of adjusting the brightness of the electronic visual display further comprises increasing the brightness of the electronic visual display to a level corresponding to the ambient luminance value when the ambient luminance value is higher than the reference luminance value.

10. The method as claimed in claim 9, wherein the step of adjusting the brightness of the electronic visual display further comprises maintaining the brightness of the electronic visual display when the ambient luminance value is equal to the reference luminance value.

11. The method as claimed in claim 5, wherein the step of adjusting the brightness of the electronic visual display further comprises maintaining the brightness of the electronic visual display when the ambient luminance value is equal to the reference luminance value.

12. The method as claimed in claim 5, wherein the reference luminance value is a previous ambient luminance value determined based on one or more previously captured first images.

13. The method as claimed in claim 5, wherein the reference luminance table comprises a plurality of reference luminance ranges, each range corresponding to a specific brightness level; wherein the step of adjusting the brightness of the electronic visual display further comprises determining a target brightness by identifying which reference luminance range the ambient luminance value falls into; and wherein the step of adjusting the brightness of the electronic visual display further comprises adjusting the brightness of the display to the target brightness.

14. An electronic device, comprising:

an image sensor having a field of view and configured to take images;

an electronic visual display;

a memory unit storing a computer program comprising program instructions for adjusting brightness of the electronic visual display; and a processing unit;

wherein upon executing the computer program, the processing unit is to:

identify a luminance-indicating area in the field of view of the image sensor;

command the image sensor to capture at least one first image of the field of view;

determine an ambient luminance value for the electronic visual display using the luminance-indicating area of the at least a first image; and adjust the brightness of the electronic visual display according to the determined ambient luminance value;

wherein at the step of identifying the luminance-indicating area in the field of view of the image sensor, the processing unit is further to:

command the image sensor to capture a plurality of second images of the field of view of the image sensor, each second image being taken at a different time of a day, the plurality of second images are captured during a calibration period prior to capturing the at least one first image, calculate, for each of a plurality of candidate areas within the field of view, a luminance variation metric based on luminance values measured across the plurality of second images, and analyze the plurality of second images of the field of view so as to identify an area of the field of view of the image sensor which has the most stable average luminance level by selecting a candidate area having a minimum luminance variation metric, wherein the step of determining the ambient luminance value for the electronic visual display comprises:

obtaining a luminance value for each pixel of the luminance-indicating area of the at least one first image, and obtaining the ambient luminance value by taking an average of the luminance values of all pixels of the luminance-indicating area of the at least one first image; and store positional information of the identified luminance-indicating area for subsequent use in determining the ambient luminance value from the at least one first image.

15. The electronic device as claimed in claim 14, wherein the electronic visual display comprises one or both of:

a liquid crystal display;

a light-emitting diode display.

16. The electronic device as claimed in claim 14, wherein the electronic device is associated with a security system.

17. A non-transitory computer-readable storage medium tangibly encoded with computer-executable instructions, that when executed by a processor, perform a method comprising:

identifying a luminance-indicating area in a field of view of an image sensor of an electronic device, the electronic device having an associated with electronic visual display;

capturing at least one first image of the field of view by the image sensor;

determining an ambient luminance value for the electronic visual display using the luminance-indicating area of the at least one first image;

adjusting the brightness of the electronic visual display according to the determined ambient luminance value;

wherein the step of identifying the luminance-indicating area in the field of view of the image sensor comprises:

capturing a plurality of second images of the field of view by the image sensor, each second image being taken at a different time of a day, the plurality of second images are captured during a calibration period prior to capturing the at least one first image, calculating, for each of a plurality of candidate areas within the field of view, a luminance variation metric based on luminance values measured across the plurality of second images, and analyzing the plurality of second images so as to identify an area of the field of view of the image sensor which has the most stable average luminance level by selecting a candidate area having a minimum luminance variation metric, wherein the step of determining the ambient luminance value for the electronic visual display comprises:

obtaining a luminance value for each pixel of the luminance-indicating area of the at least one first image, and obtaining the ambient luminance value by taking an average of the luminance values of all pixels of the luminance-indicating area of the at least one first image; and storing positional information of the identified luminance-indicating area for subsequent use in determining the ambient luminance value from the at least one first image.

* * * * *